(12) United States Patent
Bethke

(10) Patent No.: US 7,858,945 B2
(45) Date of Patent: Dec. 28, 2010

(54) IMAGING DETECTOR

(75) Inventor: Klaus Bethke, Almelo (NL)

(73) Assignee: PANalytical B.V., Almelo (NL)

( * ) Notice: Subject to any disclaimer, the term of this patent is extended or adjusted under 35 U.S.C. 154(b) by 159 days.

(21) Appl. No.: 12/365,562

(22) Filed: Feb. 4, 2009

(65) Prior Publication Data

US 2009/0200478 A1 Aug. 13, 2009

(30) Foreign Application Priority Data

Feb. 5, 2008 (EP) ................... 08151089

(51) Int. Cl.
*G01T 1/24* (2006.01)
(52) U.S. Cl. .................. 250/370.06
(58) Field of Classification Search ........ 250/370.01–370.15; 378/98.8
See application file for complete search history.

(56) References Cited

U.S. PATENT DOCUMENTS

| | | | |
|---|---|---|---|
| 5,889,313 A | 3/1999 | Parker | 257/429 |
| 6,204,087 B1 | 3/2001 | Parker et al. | 438/56 |
| 6,933,503 B2 | 8/2005 | Sipilä et al. | 250/370.09 |
| 2003/0218134 A1 | 11/2003 | Matoba et al. | 250/370.13 |
| 2007/0176200 A1 | 8/2007 | Hatanaka et al. | 257/184 |
| 2009/0045346 A1 | 2/2009 | Von Kanel et al. | 250/370.09 |

FOREIGN PATENT DOCUMENTS

WO WO 02/067271 8/2002

OTHER PUBLICATIONS

SAmavedam et al., "High-quality germanium photodiodes integrated on silicon substrates using optimized relaxed graded buffers," 1998, Applied Physics Letters, vol. 73, No. 15, pp. 2125-2127.*

Kostamo et al., "Ge/GaAs heterostructure matrix detector," Nuclear Instruments and Methods in Physics Research, Sec. A, 563, pp. 17-20, 2006.

Knoll, "Radiation Detection and Measurement," XP002508883, p. 465, Jan. 1989.

Zhao et al., "Digital Radiology Using Active Matrix Readout of Amorphous Selenium: Radiation Hardness of Cadmium Selenide Thin Film Transistors," Med. Phys. 24 (4), pp. 527-538, Apr. 1998.

European Patent Office, European Search Report—Application No. 08151089.3, dated Jan. 13, 2009, 7 pages.

* cited by examiner

*Primary Examiner*—David P Porta
*Assistant Examiner*—Kiho Kim
(74) *Attorney, Agent, or Firm*—Sunstein Kann Murphy & Timbers LLP

(57) ABSTRACT

A hybrid imaging detector is for detecting ionizing radiation such as X-rays or electron radiation, or other ionizing radiation. The detector has a sensor (10) on a read-out chip (20). The sensor (10) includes a plurality of sensor material layers (12,14) of different materials stacked on top of one another, having differing radiation absorbing properties. The materials may be Si and SiGe, Si and Ge, or Si and amorphous Se, for example. The read-out chip is a photon-counting read-out chip that records a single count when it detects a pulse above a threshold.

16 Claims, 2 Drawing Sheets

IMAGING DETECTOR

CROSS-REFERENCED TO RELATED APPLICATIONS

This application claims priority from European Patent Application EP 08151089.3, filed on Feb. 5, 2008, which is hereby incorporated by reference, it is entirety.

FIELD OF INVENTION

The invention relates to an imaging radiation detector, and in particular embodiments to a radiation detector of a hybrid type including an integrated circuit for carrying out counting of X-rays, electrons or generally ionizing radiation.

BACKGROUND ART

Imaging radiation detectors, for example for X-rays or electrons, can take the form of a hybrid, in which a read-out chip includes electronics for reading out and processing data, and a sensor is mounted directly over the read-out chip, this assembly having a number of pixels resulting from a regular grid of interconnection bonds between the sensor and the read out chip (planar geometry). In an alternative setup the sensor itself has pixels due to a regular arrangement of electrodes machined into the sensor (3D) geometry). The pixels are to detect X-rays, electrons or generally ionizing radiation, spatially resolved, arriving at the respective pixel. When an X-ray, electron or generally ionizing radiation interacts with a pixel, it creates electric charge which is read out by the read-out chip. Such detectors can act as imaging sensors.

A commercial radiation detector of the first type is the PIXcel (trade mark) detector sold by Panalytical BV which uses a Si sensor. Each pixel of the sensor has a respective bump bone connecting the pixel to a respective read-out circuit.

When a X-ray is absorbed in a pixel of the sensor it interacts with an atom to produce a photoelectron that in turn excites a number of outer electrons from Neighbouring atoms an hence creates a cloud of electrons (and holes) in a small spatial region of the sensor material. There may be of order a couple of thousand electrons in the cloud. The number of electrons is proportional to the energy of the X-ray photon. The bias voltage causes the electron could to diffuse to the back of the sensor where it is passed through the bump bond to the read-out chip and is transformed into an electrical pulse by the individual circuit of the pixel and detected as a count.

The read-out chip can process the electrical pulse received to build up an image. This can be done in a number of ways. Usually counts are collected, spatially resolved, in the pixel matrix of the detector once a generated electrical pulse exceeds a voltage threshold. The different amounts of counts collected in the pixel matrix form an absorption contrast pattern, i.e. an image of an object. In X-ray diffraction experiments the counts of pixels form 2-dimensional X-ray diffraction patterns and they can also specially be integrated or binned together to form diffractograms, the latter being realized with the PIXcel detector.

The use of germanium in a radiation detector is taught by U.S. Pat. No. 6,933,503 which describes a bulk germanium X-ray detector sandwiched between two thin oppositely doped GaAs layers which accordingly constitute a pn diode. One of the GaAs layers is divided to make a plurality of pixels. The germanium is much thicker than the GaAs layers so that the X-rays are substantially all absorbed in the bulk germanium.

X-rays or electrons can cause damage to the read-out chip when they interact with the read-out chip. This can cause problems and failure of the radiation detector. Such issues are a particular problem in the case of laboratory X-ray analysis using Mo radiation at 17.4 keV or using X-rays from a synchrontron source at up to 20 keV instead of the more typical Cu radiation at 8 keV for detectors when being equipped with a Si sensor.

A known approach to reducing the damage caused by X-rays or electrons is to use a material that inherently absorbs more X-rays or electrons such as GaAs, CdZnTe or CdTe instead of Si. Unfortunately, such materials are still very problematic as sensors and normally give limited detector performance. Processing on Si is normally much easier than with such more exotic materials.

Another approach is that taught in U.S. Pat. Nos. 5,889,313 and 6,204,087 which teach a different configuration with anode bars extending through a sensor. These bars are biased to collect electrons. The configuration has the advantage that the electrons generated by radiation have less far to travel to the anode bars than they would to a collection or measuring electrode on the surface of the sensor. The configuration is said to reduce radiation damage.

However, this configuration has proven very difficult to manufacture in practice to achieve commercial devices. It is very difficult to manufacture very narrow through-holes in a 300 µm thick substrate with the correct aspect ratio and spacing. If a thinner sensor is used, absorption is generally too low for optimal sensitivity as is typically the case for X-ray laboratory analysers.

Thus, there remains a need for a Si-based sensor that better protects the read-out chip against radiation damage in the range 8-20 keV. This is important because read-out chips of high spatially resolving detectors may be fabricated in sub-micron CMOS processes which show a certain radiation hardness but do not employ specifically radiation hard designs.

SUMMARY OF INVENTION

In accordance with one embodiment of the invention, there is provided an imaging detector for detecting ionizing radiation, such as X-rays or electrons, in a predetermined energy range. The imaging detector includes a read-out chip having read-out circuitry. A sensor electrically connected to the read-out chip absorbs ionizing radiation over a plurality of pixels. The read-out chip has circuitry to record a pulse in a pixel when it detects a charge excited by a photon or electron greater than a threshold charge. The sensor includes a plurality of sensor material layers of different materials stacked on top of one another, having differing radiation absorbing properties, wherein the plurality of sensor material layers absorbs at least 70% of incident radiation across the predetermined energy range. The sensor material layers include a first sensor material layer of a first semiconductor, a second sensor material layer of a second semiconductor and a buffer layer between the first sensor material layer and the second sensor material layer. The buffer layer has a graded composition varying from the material layer. The buffer layer has a graded composition varying from the material of the first sensor material layer to the materials of the second sensor material layer.

The inventor has realised that by increasing the absorption in the sensor over the range in question it is possible to reduce radiation damage to the detector, including the read-out chip.

In other words, the inventor has realised that it is possible to use an additional active layer to reduce radiation damage, rather than apply a passive radiation absorbing layer for example on the top of the read-out chip.

By applying the additional radiation absorbing layer on the top of the Si substrate there is no need to pattern the radiation absorbing layer, for example to provide through holes through the radiation absorbing layer for bump bonds connecting the read-out chip and sensor.

There is however a major issue with using more than one different material in the sensor layers. This is the problem that each layer will react differently to X-rays or electrons. In particular, an X-ray photon or electron of a particular energy will, in general, develop a different amount of charge depending on the layer of the sensor it is absorbed in. This makes read-out difficult.

However, the read-out chip has circuitry to record a single count when it detects a charge corresponding to a pulse greater than a threshold in a pixel. In this way, the read-out chip will record a photon or electron regardless of the layer in which the photon or electron is absorbed, as long as the pulse is greater than the threshold. This allows the hybrid radiation detector to still function properly.

Moreover, compared with a hybrid detector with a sensor simply using silicon, which is not particularly efficient at absorbing X-rays, the hybrid detector according to the invention can better absorb X-rays in the sensor, which has the additional significant benefit of increasing the sensing efficiency.

The sensor material layers may include a layer of Si and a layer including an element having a higher atomic number than Si. In this way, the layer having higher atomic number can have a higher absorption per unit length allowing a higher absorption in the sensor for a given thickness of the sensor. This extends the range of applications to higher energies, e.g. for protein crystallography performed at synchrontron rings using the energy range 11 keV-15 keV and X-ray diffraction at Mo radiation, 17.4 keV, in laboratory analysers. Significant benefits are thus the better absorption compared to Si sensors only and the relatively easy manufacturability compared to other materials.

The sensor material layers may include a second sensor material layer of Ge or SiGe on a first sensor material layer of Si. SiGe or Ge are far more conveniently integrated into conventional Si processing than more complex materials such as GaAs, CdZnTe or CdTe. However, the working principle of the read-out of a photon counting detector with more than one active layer is a general one an not limited to the given example.

The sensor material layers in the Si/Ge case include a buffer layer between the first sensor material layer and the second sensor material layer, where the buffer layer has a graded composition varying from the first sensor material layer to the second sensor material layer in order to adapt for the lattice mismatch.

As an alternative to the planer detector geometry without the sensor being laterally patterned, the sensor can include also a plurality of conductive rods (as described in U.S. Pat. Nos. 5,889,313 and 6,204,087), but for the new invention reported here extending through the first sensor material layer and the second sensor material layer. The rods can provide a path to the read-out circuitry for electrons and holes in both first and second material layers without needing to cross the interface between the first and second material layers.

An alternative for the second sensor material layer can also be an amorphous layer, e.g. amorphous selenium. As the interface between the two layers may represent an obstacle for charge carrier diffusion across the interface, the use of conductive bars extending essentially perpendicular to the interface is of particular use in this configuration.

BRIEF DESCRIPTION OF THE DRAWINGS

For a better understanding of the invention embodiments will now be described, purely by way of example, with reference to the accompanying drawings, in which.

The figures are schematic and not to scale. Like or similar components are given the same reference numerals in different figures.

DETAILED DEDCRIPTION OF SPECIFIC EMBODIMENTS

Figure 1:
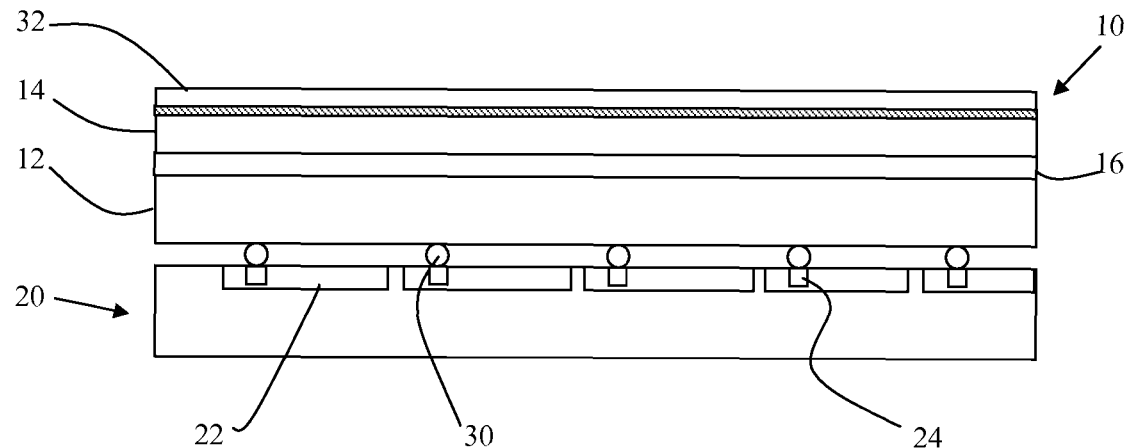
FIG. 1 shows in side view a first embodiment of the invention.

Referring to FIG. 1, a sensor 10 is mounted on a read-out chip 20 using a plurality of bump bonds 30 each corresponding to a respective pixel. The read-out chip includes a separate photon counting detector 22 for each pixel and hence each bump bond 30.

The sensor 10 includes two sensor material layers 12,14. The first of these sensor material layers is a silicon substrate 12 and the second sensor material layer is a germanium epitaxial layer 14. In the embodiment the substrate 12 is 300 µm thick and the epitaxial layer is 50 µm thick. A thin buffer layer 16 is provided between the substrate 12 and epitaxial layer 14, the buffer layer having a compositional gradient of silicon and germanium, with a high silicon content adjacent to the silicon substrate 12 and a high germanium content adjacent to the germanium epitaxial layer 14 to minimize lattice strain and distortion.

An ohmic contact 42 is formed by implantation in the second material layer 14 and an ohmic electrode 32 making an ohmic contact to the second material layer 14 is provided on the second material layer 14.

The use of a silicon substrate allows for the use of conventional semiconductor manufacturing facilities and aids integration as well as easing manufacture. In the embodiment, both the sensor 10 and the read-out chip 20 are of Si, the sensor of high-ohmic material and the read-out chip of the normal type used for CMOS processes.

Each photon counting detector 22 has a threshold and counts pulses exceeding the threshold. The photon counting detector 22 includes a bias circuit 24 that applies a positive bias to the read-out chip 20 with respect to the ohmic electrode 32 and hence applies a positive bias to the rear of the sensor 10 that causes the electrons excited by a radiation photon or electron to drift towards the rear. The read-out chip can also operate in hole collection mode. In that case the read-out chip 20 is put on ground and the positive bias applied to the ohmic electrode 32.

For convenience of description, the following description describes the response to X-rays but the same detector will also detect electrons or generally ionizing radiation in the same way.

When an incident X-ray photon is absorbed in the sensor 10 it generates a cloud of electrons, and holes. The number of electrons in the cloud is proportional to the energy of the incident X-ray photon. However, since the X-rays may be absorbed in the germanium epitaxial layer 14 or the substrate 12, the size of the pulse will vary even for photons having exactly the same energy. For example, a single photon may create a cloud of 2200 electrons for Cu tube radiation (8 keV) if absorbed in the Si layer but the same photon will create roughly 30% more electrons (2850 electrons) if absorbed in the Germanium.

Note that both material layers 12,14 absorb significant amounts of X-rays in the predetermined energy range. Each of the first and second material layers may thus absorb at least 10% of the incident X-rays or electrons in at least part of the energy range or interest. More importantly, the total absorption is preferably over 70% over the whole of the predetermined energy range of interest, further preferably at least 90% or even 95%.

The invention allows increase absorption compared with a simple Si sensor even when using a relatively thin silicon substrate. The thickness of the Si substrate can be, for example 200 to 500 μm. The upper layer can have a thickness less than this, for example 20 and 50 or 100 μm. In practice, the layer thickness will be limited by detector properties depending on proper layer growth.

Figure 2:
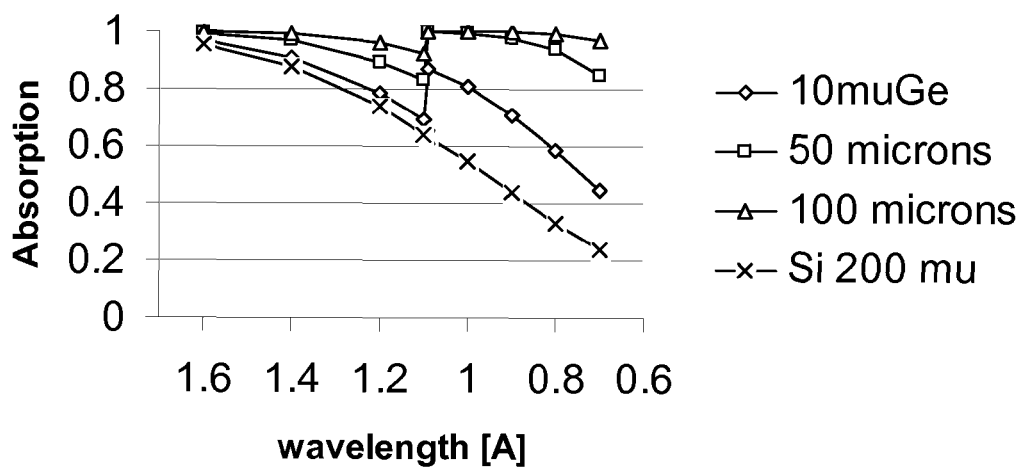
FIG. 2 illustrates the absorption for various layer combinations.

FIG. 2 illustrates the absorption over a wavelength range of 0.17 to 0.06 nm which corresponds to approximately 7 to 20 keV, for a 200 μm Si substrate with 10, 50 and 100 μm Ge on top. It will be seen that 50 μm already gives very significantly better results than just using Si, and 100 μgives excellent results. In particular, the absorption for Mo radiation (0.07 nm wavelength) rises from 37% with Si alone to 84% with 50 μm Ge and 97% with 100 μm Ge. In the range from 11 keV to 15 keV (wavelength 0.11 nm to 0.08 nm) the 100 μm Ge layer delivers more than 99.5% absorption throughout, 99.9% between 11 keV and 14 keV. This latter range is particularly suited to carry out protein crystallography using a synchrotron X-ray source.

A further benefit of using both Si and Ge is that Si is a good absorber of energies below 11 keV. Ge is not much better than Si in that region, but is excellent in the range 11-15 keV which allows protein crystallography in synchrotron system, and is also good at 17.4 keV which is suitable for Mo radiation. Thus, the combined system has improved properties over a broad range.

The applied bias causes the electrons to drift towards the positive potential applied at the read-out chip 20, through the rear of the sensor 10 and then through the bump 30 to the respective read-out circuit. The charge is amplified and converted to create an electrical pulse corresponding to the amount of charge and hence the number of electrons generated.

The read-out chip can include circuitry to avoid loss of counts due to charge sharing and to avoid extra counts due to double counting, caused by some electrons of a cloud excited by a single photon or electron passing through adjacent bumps. When a pulse is detected at the same time in adjacent pixels, it is ascribed to only one pixel, for example the pixel which detects the highest charge. In other chips without correction circuits, having high spatial resolution, these effects will be present and are minimized by a proper threshold setting.

In order to cope with the variable pulse size caused by using two different materials, the photon counting detector is thresholded, and counts each pulse as a single count if the pulse exceeds a predetermined size. In this way, all photons are counted equally regardless of the layer in which they are absorbed.

Typically, for an experiment operating using radiation at a particular predetermined energy, the threshold voltage level will conveniently correspond to half of the number of electrons induced by a photon of that energy in the layer which generates more electrons. Consider the above example in which a particular energy of photon generates a cloud of 2200 electrons in one layer and 2850 electrons in another layer on top. The threshold should be 1400 electrons in the pulse, i.e. to half the higher number of electrons generated. In general, the threshold should be form 45% to 60% of the higher number of electrons generated.

If a photon generates a photon cloud close to the edge between one pixel and another, the photon cloud may be read-out through the read-out sensors of both pixels. With the suggested threshold, the cloud will only be read out in at most one of the pixels, avoiding double counting, since at least half the cloud needs to pass through one read-out pixel to create a count. Thus, using a suitable threshold itself avoids double counting while minimizing losses due to charge sharing.

Introducing more than one absorbing layer has an additional benefit. This is very important for lower energies in the vicinity of the noise level of the detector and when the additional layers produce more electrons per incident photon as is the case for Ge on Si. Usually, X-ray diffraction experiments are performed with Cu radiation at 8 μkeV. The noise level might be between 3 and 4 keV for a Si sensor. For the layered detector the value should not be far higher. The threshold could then be set at 1100 electrons equivalent to about 4 keV. A flat distribution due to charge sharing exists between the noise and the Cu peak. The close distance of the 8 keV Cu peak to the noise imposes restrictions on the choice of the threshold level and for chips with good electronics and fabricated properly the 1100 electron level can just be realized.

In such a situation, even small variations of the threshold level due to stability issues of the electronics can have significant influences and can cause intensity fluctuations in measurements.

In contrast, in the device described here with two absorption layers, the second absorption layer on top of the first maximises the absolute absorption in this second absorption layer. The important fact is that the detector response peak at about 2850 electrons for Ge for 8 keV is now much further away from the noise level of the detector compared to the 2200 electrons for Si. This is very beneficial for the stability of the response for the detector and for the homogeneity of the pixel-to-pixel response as well as for the precision for repeated measurements.

The setting of the voltage threshold level to 1400 electrons in the present two layer detector is not also further away from the noise compared to 1100. This threshold level is highly suitable for the peak with the higher number of electrons (second absorption layer in the example) avoiding double counting and losses due to charge sharing. When the ionizing radiation is absorbed in the Si layer the threshold is a little higher than the charge sharing level (half the number of electrons generated). This loses a very small amount of counts but minimizes double counting and also keeps the signal further from the noise.

In the specific embodiment, the layer which generates the higher number of electrons also absorbs the strongest, both since it is the first layer reached by ionizing radiation and also has a larger absorption. By setting the threshold to half the number of electrons generated in the layer that generates more electrons, in the example the Ge layer, the detector operates effectively further away from its noise level and is very suitably set, thus increasing the stability, homogeneity or response and precision.

It should be generally noted that the layered detector also functions for higher energies as for instance for medical applications. Moreover, the fact that the two peaks are correlated in intensity, position and shape, means that the energy windowing can be used for energy dispersive analysis in case more than one energy of radiation is used at the same time.

The electron pulse should be collected as efficiently as possible and with minimum loss of charge. In this regard, the multiple layers must be arranged to avoid the interfaces between layers resulting in loss of charge. The buffer layer 16 in the embodiment has the effect of avoiding sharp interfaces and thereby ensuring that any potential barrier is smooth. Investigations of the defect structure at interfaces suggest only a weak influence on the charge transport through the interface for well grown epitaxial layers.

Optionally, the sensor 10 can be divided into separated pixels by material patterning. However, this is only required in the case of amorphous layers which will create discontinuous interfaces or layers between which too high barriers for proper electron transport through the interfaces are created. Instead, in proper epitaxial systems, the sensor can simply comprise the sensor material layers stacked on top of on another continuously in the lateral direction and the pixels can be determined by the positions of the bumps or alternative connections to the read-out chip. Each cloud of electronics will tend to be collected at the nearest bump so the pixel locations are effectively determined by the bumps.

For a good functioning of the detector the layers may be sufficiently depleted, which could be achieved by adaption of a suitable bias potential. For 300 μm Si only, 100V is usual, for 100 μm GaAs only, 350V is reported. The described Ge/Si system should have a similar operating range. The bias potential helps charge carrier transport across the interface consisting of different bandgap widths on either side.

It is important to notice that the read-out chip is designated to function properly with the layers together. Ge is known to have a 1000 times higher leakage current than Si at room temperature. The read-out electronics has a leakage current compensation circuit taking care of this situation. In spite of the apparent problem this might cause, circuits with even such a large additional current still work properly as a detector.

Another consequence of this is that in principle cooling might not be necessary for the layered arrangement, unlike conventional Ge detectors. Nevertheless, for optimization purposes temperature stabilization of moderate cooling (Peltier) may still be useful. In particular, special care may need to be taken that too large space charges are not generated by the leakage current in Ge, since the space charge may be transported through the high resistivity Si. Cooling will help in this case.

This choice of material for the second sensing material layer 14 can be varied. One option, instead of the epitaxial germanium described above, it to use epitaxial silicon-germanium.

An alternative embodiment uses multiple layers. For example, in one example a silicon substrate has a graded buffer 16 of thickness 1 to 5 μm, followed by 30 μm Ge, followed by a further buffer, 10 μm Si, a further buffer and 30 μm Ge. The number of Ge layers can be increased as required, with additional buffer layers and Si layers as necessary.

The use of multiple Ge layers can provide a sufficient thickness of Ge even if it proves difficult to reliably grow a sufficient thickness of single crystal Ge in a single layer. In such an arrangement it is crucial to realize a stack with good crystallographical growth of the lattices and interfaces and minimized dislocation densities. Furthermore the band offsets should be smoothed out by the graded buffer layers in order to avoid sharp barriers. Then, the applied bias must be sufficiently high to drive the charge carriers of choice to be collected through the layers above the small variations of conduction band variations in the case of electrons and above the variations in the valence band variations in the case of holes. There may be even asymmetric heights of variations of band offsets for electrons and holes in a layer due to residual strain and the art lies in the best choice for the type of charge carriers to be collected, electrons or holes, together with a proper choice of layer thickness.

Figure 3:
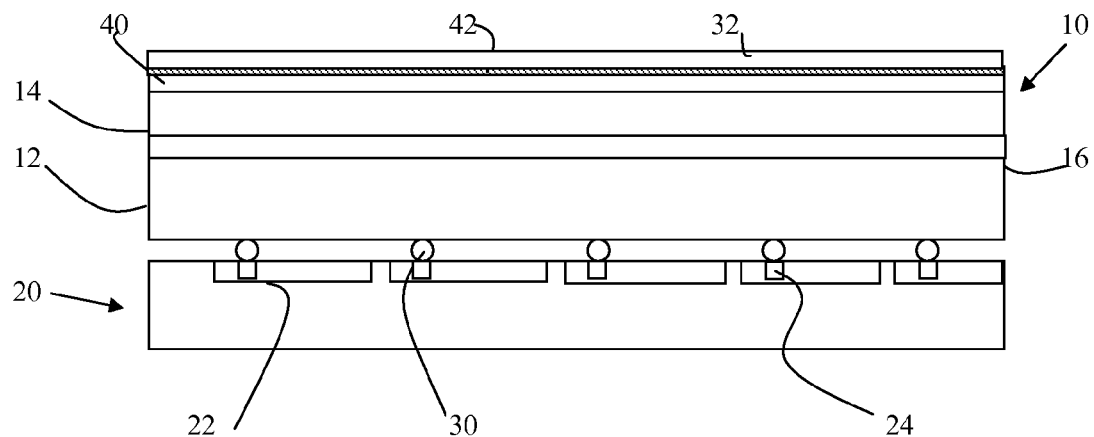
FIG. 3 illustrates a second embodiment with an end cap.

FIG. 3 illustrates a second embodiment. In particular, an end cap 40 of Si/SiO$_2$ combined with a GeSi graded buffer layer having a thickness smaller than 1 μm up to 10 μm is added on top of the Ge layer 14.

The reason for the end cap is to allow the sensor 10 to processed as if it were a Si chip, and not a chip with Ge. In order to operate the sensor 10, a voltage needs to be applied across the chip (vertically in the Figures) which means attaching an ohmic contact to the front of the chip and ohmically contacting the bump bond 30 to the rear of the chip.

A lot of technical effort has gone into making ohmic contacts to Ge by a number of groups. Although these efforts have met with some success, and it is possible to make ohmic contacts to Ge, it is very difficult technology and not widely available or practised.

In contrast, in the arrangement of FIG. 3, by forming a thin Si capping layer on the top a top ohmic contact can be made to the Si using technology that is much better known and understood.

In particular, an ohmic contact can be formed in the capping layer of the silicon, by implantation. An electrode 32 then makes contact with the ohmic contact. The ohmic contact can be a thin contact that does not extend the full thickness of the capping layer to avoid any effects of the Si—Ge interface.

Figure 4:
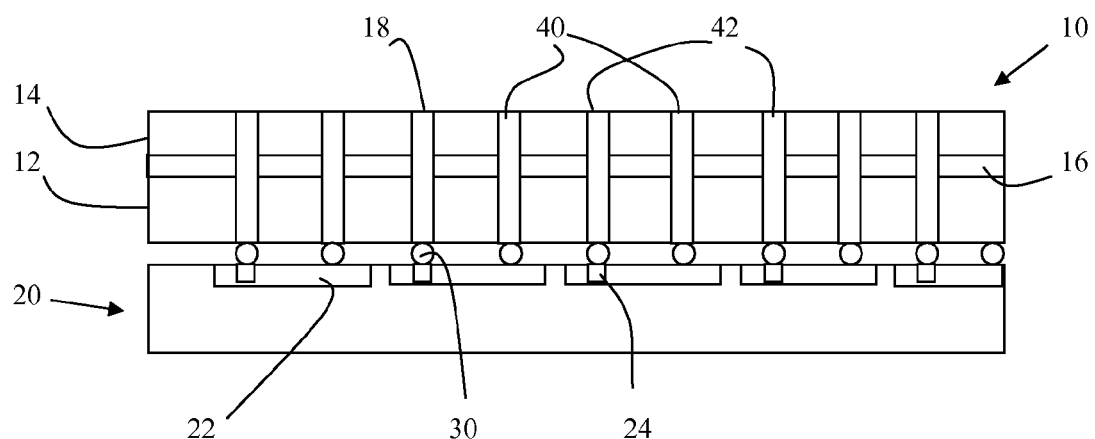
FIG. 4 shows in side view a third embodiment of the invention.

In a third embodiment, illustrated in FIG. 4, the possible impact of the interface potential on electron collection is dealt with in a different way. In particular, rods 18 are provided extending through both the first and second sensing material layers, the rods accordingly extending substantially perpendicular to the plane of the sensor 10. The rods 18 are divided into anode rods 40 and cathode rods 42, alternating across the sensor 10. The rods may be arranged in an array over the surface of the sensor. Each of the rods 18 is connected to the read-put chip, anode rod 40 is connected to a respective photon counting detector 22, and the cathode rods 42 to bias circuitry 24.

Such rods 18 can be made by machining through holes through the sensor 10 and filling the through holes with a suitable conductor such as metal.

Bias is provided between the cathode rods 42 and the anode rods 40, providing a lateral bias. In this approach, an electron cloud excited by the X-rays in either the first or second material layer can reach a respective anode rod 40 without crossing the interface between the first and second material layers 12,14.

Note that the approach according to this arrangement solves a problem that exists with existing X-ray detectors using anode rods such as that described in U.S. Pat. Nos. 5,889,313 and 6,204,087. Detectors investigated in that research use a 200 μm Si substrate in view of difficulties in forming suitable holes through thicker substrates. The problem is that some X-rays, for example the 8 keV Cu X-rays used in commercial equipment, need at least 300 μm of Si for optimum sensitivity.

By using the multi-layer approach including one layer which absorbs X-rays more efficiently than Si, the substrate can be thinner using the invention than by simply using the Si substrate of U.S. 5,889,313 and 6,204,087. This allows holes to be machined through the full substrate thickness.

If holes in thicker substrates are required, this can be achieved alternatively by means of laser drilling. This method is more difficult (and hence expensive), however, high aspect ratios of holes in 300 μm thickness can be achieved with good results.

The approach using rods 18 may in particular be used with the amorphous selenium/silicon detector since this avoids the need for the electrons collected in either layer to pass through the interface before being collected.

This embodiment may as an alternative use an amorphous selenium layer as the second sensing material layer 14. Although this creates an abrupt interface, however, the anode-cathode rod structure perpendicular to the surface allows the charge carrier flow to the read-out chip.

It will be appreciated by those skilled in the art that the above embodiments are purely by the way of example and many variations are possible.

Although the flip chip bumps 30 are shown as round bumps in the drawings in practice the bumps 30 may of course be flat layers deposited by evaporation.

Preferably, the layers should aid detector engineering purposes or improve structural or electronic properties.

What is claimed is:

1. An imaging detector for detecting ionizing radiation, such as X-rays or electrons, in a predetermined energy range, comprising:
   a read-out chip including read-out circuitry; and
   a sensor for absorbing ionizing radiation over a plurality of pixels, the sensor being electrically connected to the read-out chip; wherein
   the read-out chip has circuitry to record a pulse in a pixel when it detects a charge excited by a photon or electron greater than a threshold charge; and
   the sensor includes a plurality of sensor material layers of different materials stacked on top of one another, having differing radiation absorbing properties, wherein the plurality of sensor material layers absorbs at least 70% of incident radiation across the predetermined energy range;
   wherein the sensor material layers include a first sensor material layer of a first semiconductor, a second sensor material layer of a second semiconductor and a buffer layer between the first sensor material layer and the second sensor material layer, wherein the buffer layer has a graded composition varying from the material of the first sensor material layer to the material of the second sensor material layer.

2. A detector according to claim 1, wherein the first and second material layers have the properties that ionizing radiation in the predetermined energy range generates at least a first charge when absorbed in the first material layer and generates at least a second charge when absorbed in the second material layer; and the threshold charge is between 45% and 60% of the higher of the first charge and the second charge.

3. A detector according to claim 2, wherein the read-out chip is arranged to generate a voltage pulse corresponding to the amount of charge when ionising radiation is detected, to compare the voltage pulse with a threshold, and only to count pulses for which the voltage pulse exceeds the threshold.

4. A detector according to claim 1, wherein each of the plurality of sensor material layers absorbs at least 20% of incident radiation at at least one energy in the predetermined energy range.

5. A detector according to claim 1, wherein the first sensor material layer is adjacent to the read-out chip and the second sensor material layer is on the first sensor material layer, wherein the second sensor material layer absorbs at least 30% of incident radiation over the predetermined energy range, preferably 50% of incident radiation.

6. A detector according to claim 1, wherein the sensor material layers include one material layer of Si and the other material layer of Ge or SiGe.

7. A detector as in any of the preceeding claims, wherein the first sensor material layer is Si and the second sensor material layer of Ge or SiGe.

8. A detector according to claim 1 having multiple layers, including alternating first and second material layers and buffer layers between the first and second material layers.

9. A detector according to claim 8 including at least two first material layers and at least two second material layers.

10. A detector according to claim 1, further comprising a capping layer on the top of the second material layer.

11. A detector according to claim 10, wherein the capping layer is a layer of Si having a thickness in the range 1 μm to 10 μm.

12. A detector according to claim 10, further comprising an ohmic contact formed in the capping layer.

13. A detector according to claim 1, wherein the sensor includes a plurality of conductive rods extending through the first sensor material layer and the second sensor material layer, the rods being connected to the read-out chip.

14. A detector according to claim 13 wherein at least one of the first and second sensor material layers is amorphous.

15. A detector according to claim 14 wherein the amorphous second sensor material layer is of amorphous selenium.

16. A detector according to claim 1, wherein the read-out chip includes a plurality of read-out circuits each electrically connected to a single pixel.

* * * * *